(12) United States Patent
Pathak et al.

(10) Patent No.: US 7,916,651 B2
(45) Date of Patent: Mar. 29, 2011

(54) SERVICES CONVERGENCE AMONG HETEROGENEOUS WIRED AND WIRELESS NETWORKS

(75) Inventors: Jogen Pathak, Irving, TX (US); Rangaprasad Govindarajan, Plano, TX (US); Piyush Charan, Ahmedabad Gujurat (IN); Anureg Vohra, Ahmedabad (IN)

(73) Assignee: Varaha Systems Incorporated, Dallas, TX (US)

( * ) Notice: Subject to any disclaimer, the term of this patent is extended or adjusted under 35 U.S.C. 154(b) by 0 days.

(21) Appl. No.: 12/335,909

(22) Filed: Dec. 16, 2008

(65) Prior Publication Data

US 2009/0097479 A1      Apr. 16, 2009

Related U.S. Application Data

(63) Continuation of application No. 10/845,022, filed on May 13, 2004, now Pat. No. 7,466,696.

(60) Provisional application No. 60/470,101, filed on May 14, 2003.

(51) Int. Cl.
*H04J 1/16*        (2006.01)
*H04L 12/56*    (2006.01)

(52) U.S. Cl. ......... 370/241; 370/252; 370/329; 370/389
(58) Field of Classification Search .................. 370/241, 370/252, 328, 329, 389
See application file for complete search history.

(56) References Cited

U.S. PATENT DOCUMENTS

| 7,394,761 | B2 * | 7/2008 | Foster et al. | 370/227 |
| 2004/0068571 | A1 | 4/2004 | Ahmavaara | |
| 2004/0214572 | A1 * | 10/2004 | Thompson et al. | 455/435.2 |
| 2005/0013264 | A1 | 1/2005 | Sundberg | |

* cited by examiner

*Primary Examiner* — John Pezzlo
(74) *Attorney, Agent, or Firm* — Baker Botts L.L.P.

(57) ABSTRACT

A system and method for heterogeneous network communication including wired, and wireless communication mediums for seamless data, voice, as well as multimedia applications independent of the actual communication medium, type of device, and protocols running over such communication channels. The devices are structured to operate over both wired and wireless communication mediums individually or simultaneously in the intermittent or continuous fashion in secure or non-secure mode, after obtaining explicit, implicit or no permission for usage. The system and method described herein allow the communication channels operate in their native mode of operation independent of converged application perception by user of the application, a user being a person, a machine, or any other such entity that can be identified as user.

31 Claims, 5 Drawing Sheets

SERVICES CONVERGENCE AMONG HETEROGENEOUS WIRED AND WIRELESS NETWORKS

RELATED APPLICATIONS

This application is a continuation of application Ser. No. 10/845,022 filed May 13, 2004 entitled "Services Convergence Among Heterogeneous Networks" now U.S. Pat. No. 7,466,696.

U.S. application Ser. No. 10/845,022 claims priority to U.S. Provisional Application No. 60/470,101 entitled "Mobile Networking Management for Wireless and Wireline Networks, filed by Rangaprasad Govindarjan et al. on May 14, 2003. The aforementioned provisional application is incorporated herein by reference in its entirety, for all purposes.

BACKGROUND OF THE INVENTION

The packet and circuit domain convergence for voice leverages the benefits of both technologies for achieving better value for communication expenses. Similarly, the ability to determine the path for sending IP packets through various dynamic protocols is used for routing IP information from different networks and subnetworks.

The said convergence, however does not allow the ability the same flexibility for determining communication medium similar to the routing protocols on a group by group basis (for example, Packet by packet, etc.). Also, the arts do not allow such changes in the available options dynamically. Besides, the current art for selecting is only limited to the so-called "core-network" nodes such as switches, routers, and media gateways.

SUMMARY OF THE INVENTION

Services convergence among heterogeneous wired and wireless networks.

In one embodiment, there is presented a heterogeneous communication system for communicating between a first terminal and a second terminal, said heterogeneous communication system comprising a backbone network for transmitting information from the first terminal towards the second terminal; a first access network providing access for the first terminal to the backbone network; a second access network for providing access for the first terminal to the backbone network; and wherein the first terminal selectively receives or transmits information from one of the first access network and second access network.

In another embodiment, there is presented a terminal for communication with another terminal, said terminal comprising machine-readable media for storing a program comprising a plurality of executable instructions; and a processor connected to the machine readable media, said processor capable of executing the plurality of executable instructions; wherein the program comprises a session convergence layer comprising a first portion of the plurality of executable instructions; and a transport convergence layer comprising a second portion of the plurality of executable instructions.

In another embodiment, there is presented a machine-readable medium for storing a program, said program comprising a plurality of executable instructions wherein the program comprises a session convergence layer comprising a first portion of the plurality of executable instructions; and a transport convergence layer comprising a second portion of the plurality of executable instructions.

DETAILED DESCRIPTION OF THE INVENTION

Certain aspects of the present invention, there is communication over wired and wireless networks with the ability to direct individual groups of information (e.g. byte, or a packet) over various communication mediums in their native format while minimally affecting the user experience or end machine functioning for consuming and generating information.

Figure 1:
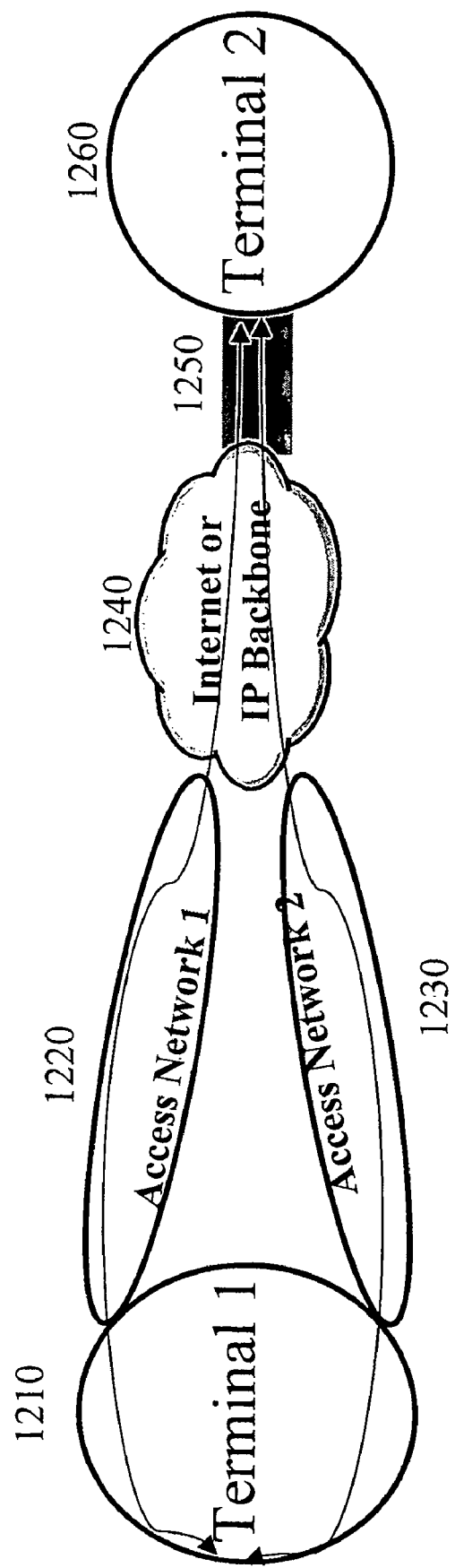
FIG. 1 is a block diagram describing an exemplary network configured in accordance with an embodiment of the present invention.

Referring now to FIG. 1, there is illustrated an exemplary converged network in accordance with an embodiment of the present invention. A first Terminal 1210 (or Peer 1), is communicating with a second Terminal (or Peer 2), 1260. The first terminals 1210 and second terminal 1260 can comprise communicating devices such as, but not limited to, a phone, cell phone, personal digital assistant (PDA), a Desktop, or laptop or handheld computer. Terminals 1210 and 1260 are connected by one or more of Access Networks 1220 and 1230, the Internet or IP backbone 1240 and a possible intermediate connection 1250. The intermediate connection can comprise, but is not limited to, the Ethernet, Sonet, IP, Wireless 802.11 or other wireless LAN network, Cable, DSL, or a cellular network (data or voice).

Terminal 1210 can selectively communicate over any number of alternative access networks 1220, 1230 either, one at a time, or simultaneously, based on the policies determined through either, implementation, programming, or user preferences. Consider a use scenario in the office. For example, if Access Network 1, 1220 is Ethernet IP network and Access Network 2, 1230 is Wireless LAN. The user puts the Terminal 1, 1210 which is laptop computer in its docking station connecting over the Access Network 1, 1220 which is Ethernet IP network. All communications, including voice, data, and video can be carried over the Ethernet IP network 1220 and although Access Network 2, Wireless LAN, 1220 is available it is idle. Now when the user removes the laptop from the docking station to take to a conference room during the meeting, user Terminal 1, 1210 connects through the Wireless LAN 1203 Access Network as the 1220 Access Network becomes unavailable, during the time the laptop is not docked. At this time, all the voice, data and Video session are transferred to the Wireless LAN, Access Network 2, 1230 with or without the user knowledge and intervention based on policies, and user preferences to continue the communication without disruption in the communication.

In another scenario, for example, if Access Network 1, 1220 is Wireless LAN and Access Network 2, 1230 is Cellular network, the voice communication can be carried over the Cellular network 1230 whereas data and Video communication are carried over Wireless LAN, 1220. Similarly, if a user using Terminal 1, 1210 enters in an elevator and the Cellular Network 1230 becomes unavailable, then the voice communication is transferred to the Wireless LAN network 1220. On the other hand, if the user using Terminal 1, 1210 leaves the home or office, the Wireless LAN Access Network 1220 becomes unavailable. At this time, the data and Video sessions are transferred to the Cellular Access Network 2, 1230.

In a third scenario, the above two scenarios can be combined to see how the communication transfers from Ethernet IP network to Wireless LAN network to Cellular network with or without the user knowledge and intervention based on policies, and user preferences to continue the communication without disruption in the communication.

Figure 2:
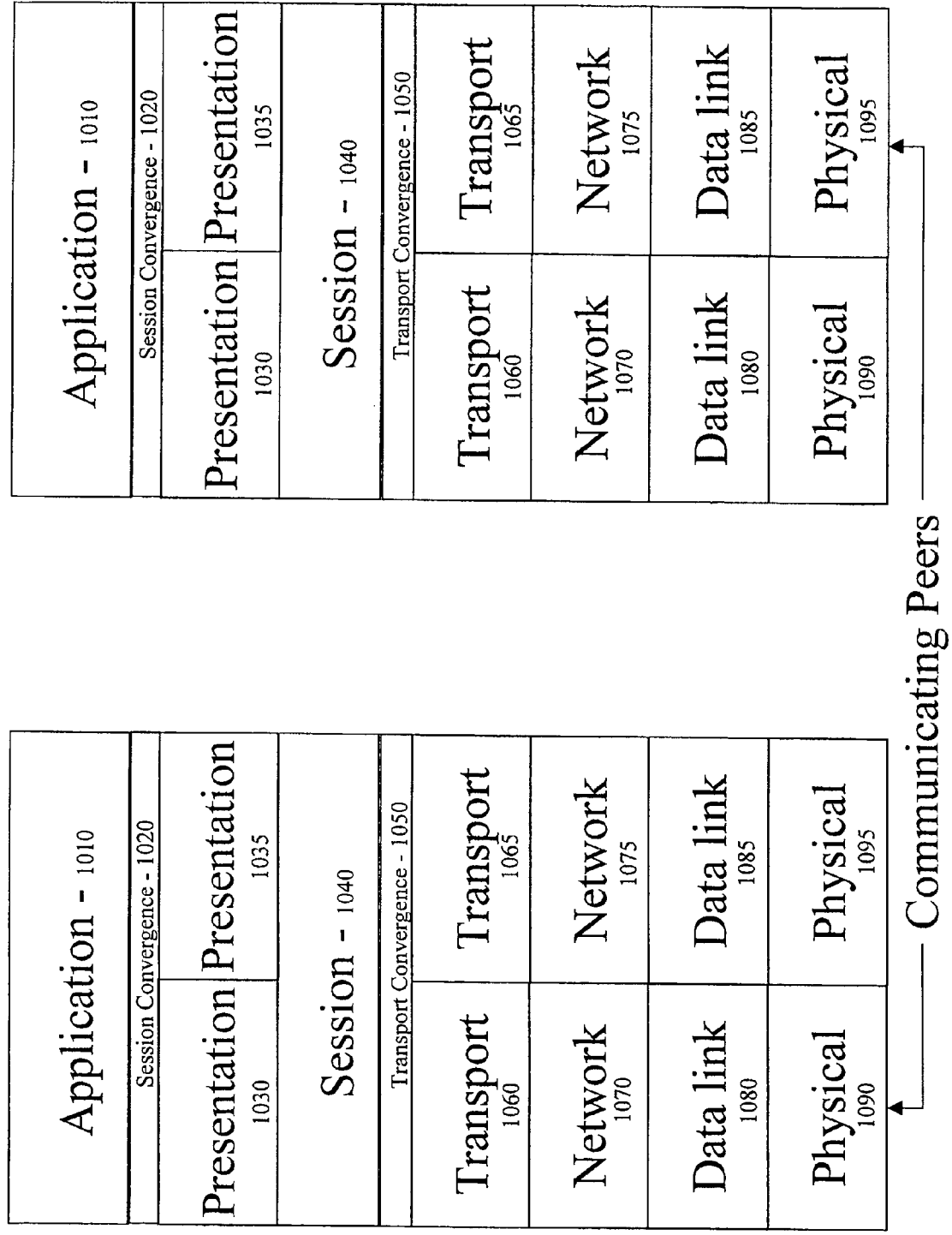
FIG. 2 is a block diagram describing an architecture for allowing communication across heterogeneous networks in accordance with an embodiment of the present invention.

Referring now to FIG. 2, there is illustrated a block diagram of an exemplary interconnection architecture for communication by a terminal, such as terminal 1 1210 over heterogeneous networks with multiple peers, such as the network shown in FIG. 1. An Application Layer 1010 generates or interprets information, provides mechanisms for generation and consumption of information, and may also provide encryption, decryption, compression and other processing support.

Communication over multiple heterogeneous networks require matching the Resource(s) availability, application requirements for the resources and the coordination, management, and adaptation to meet these demands. A session convergence Layer 1020 implements this functionality in the preferred embodiment of the invention. The Session convergence layer 1020 accepts the information processed by a presentation layer 1035 and then directs the information to the application in such a way so as to not change the existing communication method by the application to the communication mediums. Another function of the session convergence layer 1020 is resource management to avoid conflict of resources by competing presentation layers usage. The implementation of the resource management is dependent on the implementation on the target application, device, and user.

A Presentation Layer 1030, 1035 determines how computers represent data [ASCII, GIF, etc.]. The presentation layer 1030 and 1035 also include conversion to network byte order and other processing.

A session layer 1040 establishes a unique communication session, and may also associate security, authentication, as well as authorization information to the session. For example, an IP socket can be a layer 5 protocol session as defined in OSI.rg.

The transport convergence layer 1050 allows communication over multiple heterogeneous networks with the ability to make decision in this layer about using a network from the available networks to send a group of information to the communication peer. The transport convergence layer 1050 may have the capability to implement the Policies based on implementation, user preferences, and/or programmable input. This layer also receives information from the lower layers of the OSI communication stack, processes it and sends it upwards to the Session Layer 1040. The Transport Convergence Layer 1020 to provide information, network and resource utilization coordination for easy implementation and seamless experience to man and machine apparatus user.

A Transport layer 1060, 1065 offers mechanisms such as information transfer with or without loss of details in the information, data recovery capabilities, and flow control mechanisms. For example, TCP can be a layer 4 Transport protocol 1050 as defined in OSI.

A network layer 1070, 1075 allows the communicating entities such as Terminal 1, in 1201 and Terminal 2 in 1260 to address each other uniquely, provide related information to provide related routing information, as well as capability to adapt to the limitation of underlying Data link and physical Layers 1080, 1085 and 1090, 1095 respectively for the Access networks 1220 and 1230, so as to transfer information with or without the loss of transferred information.

A Data Link Layer 1080, 1085 may participate in formatting information, Transmitting information over the network and may allow error checking, communication start/stop indication and other such functionality. For example, Ethernet 802.3 can be a layer 2 protocol as defined by OSI. Different network and protocol characteristics may be defined by different data link layer specifications and the functionality can be subdivided into the Media Access Control (MAC) which controls access and encodes data into a valid signaling format [for the physical layer, 1090], and Logical Link Control (LLC), which provides the link to the network [for the Network layer 1070].

A Physical Layer 1090 may included hardware implementation and the electrical signal level implementation of the bus; network cabling, connector type, pin-out, physical data rates, maximum transmission distances, and data transmission encoding. At this layer, information is placed on the physical network medium such as Ethernet.

The requirement of one or more communicating peers with zero or more communication medium must be met over the duration of the communication and related information transfer. The architecture anticipates that one or access network 1220, 1230 may become unavailable or intermittently available during the communication. Similarly, one or more of the convergence layers 1000 and 1100 proposed her, may not be mandatory for a given the implementation.

The architecture allows communication using the transport convergence layer 1050 in the architecture to communicate with multiple communication mediums in their native mode alternatively or simultaneously. The session layer or the embodiment thereof in the actual implementation represents a unified communication access scheme to these multiple communication mediums. The use of the convergence layer at the given location may allow the information transformation through existing native implementations required for the consumption by application.

Figure 3:
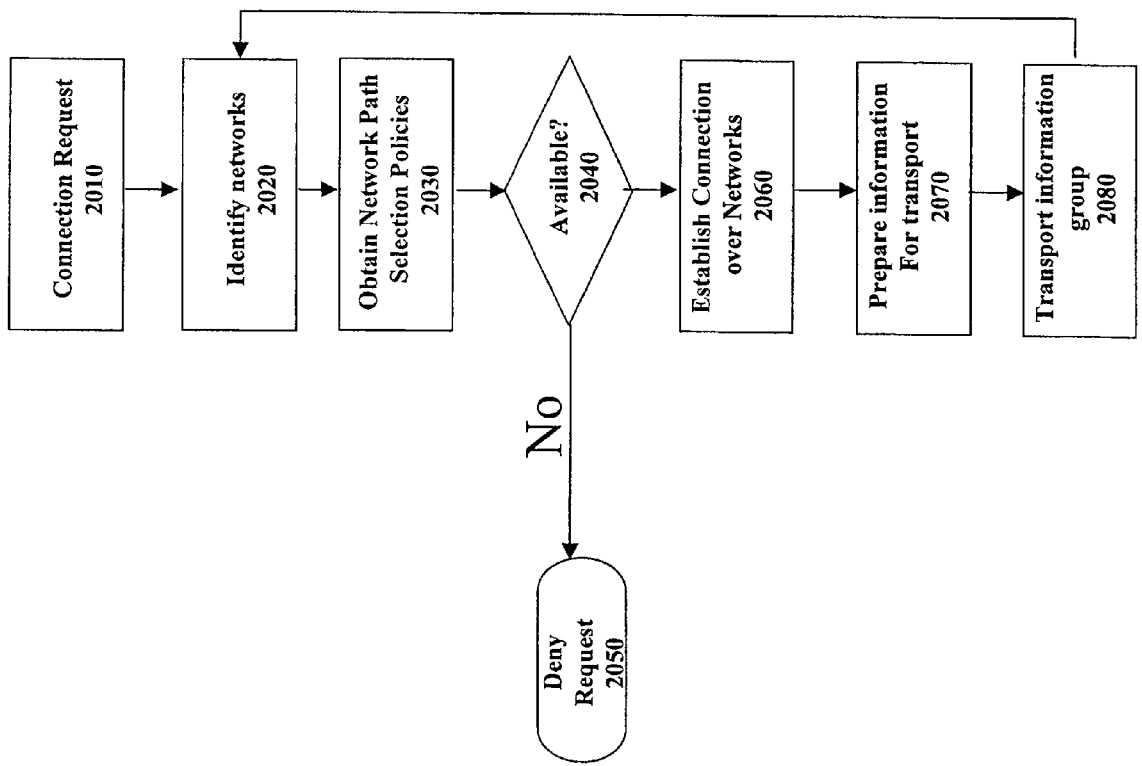
FIG. 3 is a flow diagram describing the operation of a session convergence layer in accordance with an embodiment of the present invention.

Referring now to FIG. 3, there is illustrated a flow diagram describing the operation of the Transport Convergence Layer 1050 in accordance with an embodiment of the present invention. As shown in the 2010 a request for communication can be made either from user or application native to the device or from the communicating peer such as Terminal 2, 1260 to Terminal 1, 1210. A priori or on demand upon the request, the available networks are identified as in 2020. After the networks are identified the connection request is processed based on the policies for the authorization to use network and other resources in 2030. The implementation may authenticate the access request and also go through the other steps such as encryption/decryption, address identifier acquisition based on the given network implementation based on the policy. If the policy criteria are not met then the request is declined in 2050. Otherwise, the request is processed and the connection is established in 2060. After the connection is established, the information is forwarded to Session Layer at 1040 or Transport Layer 1060 of Access Network 1, 1220 or to the Transport Layer 1070 of Access Network 2, as in 1230. The layer transfers the information and the upper layers transform the information in 2080. The process from 2020 is repeated until the policy criteria for stopping the process or exiting the stack is met.

Figure 4:
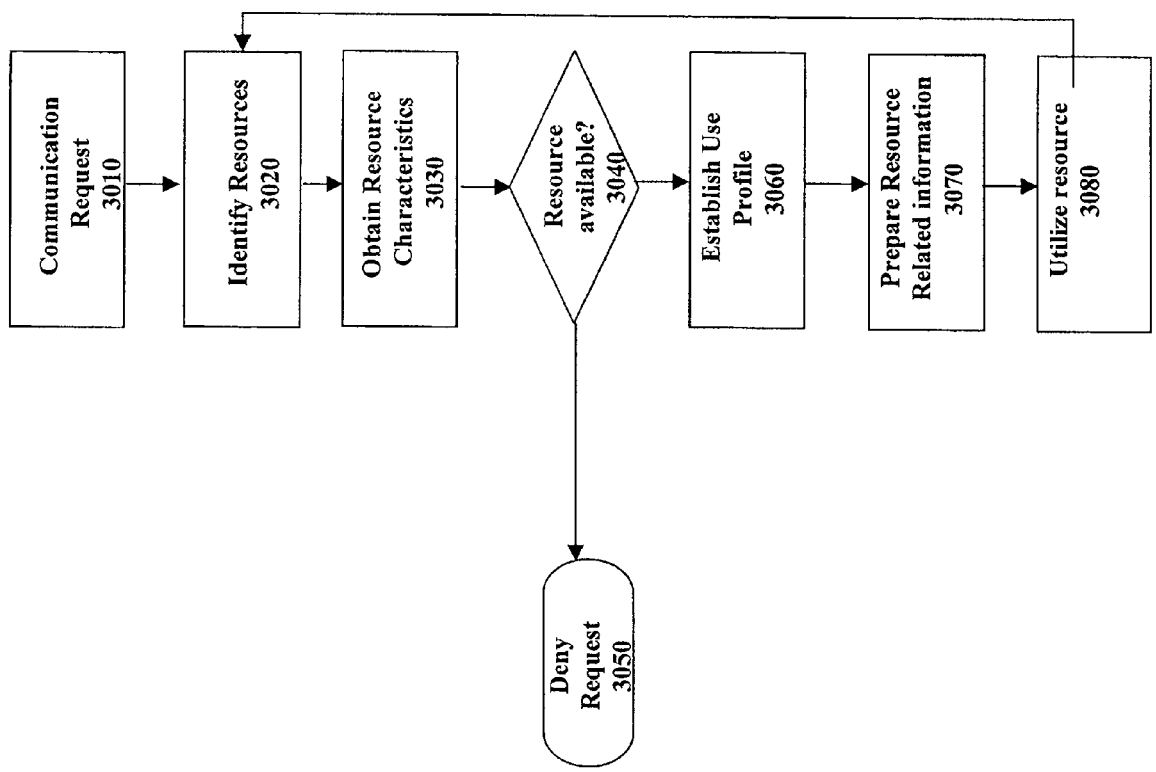
FIG. 4 is a flow diagram describing the operation of a transport convergence layer in accordance with an embodiment of the present invention.

Referring now to FIG. 4, there is illustrated a flow diagram describing the operation of the Session Convergence Layer 1020 in accordance with an embodiment of the present invention. As shown in the 3010 a request for communication can be made either from user or application native to the device or from the communicating peer such as Terminal 2, 1260 to Terminal 1, 120 transferred through the lower layers. A priori or on demand upon the request, the available resources are identified corresponding to the request as shown in 3020. After the resources are identified, the characteristics of these resources are gathered in 3030. The connection request is processed based on the policies for the authorization to use resources and the availability of these resources with other related resources in 3040. The implementation may authenticate the access request and also go through the other steps such as coding/decoding, translation, accounting and other based on the given network implementation and the policy. If the policy criteria are not met then the request is declined in 3050. Otherwise, the request is processed and the profile for the use of the resource is created in 3060. The profile is applied and the preprocessing required for the use of the resources is completed. At this time the resources are ready for use. And the connection is established as well as the acknowledgement for successful connection may be sent. The information is forwarded to application using the resources for consumption at 1010 or presentation Layer 1030 of Access Network 1, 1220 or to the Presentation Layer 1030 of Access Network 2, as in 1230. The layer transfers the information and the lower layers transfers the information in 3080. the process from 3020 is repeated until the policy criteria for stopping the process or exiting the stack is met working in conjunction with Transport Convergence Layer 1050. For example, a policy to break all the existing connection may be implemented provided no connection meeting all the policy criteria is available for a specified period of time, e.g. 5 minutes.

Figure 5:
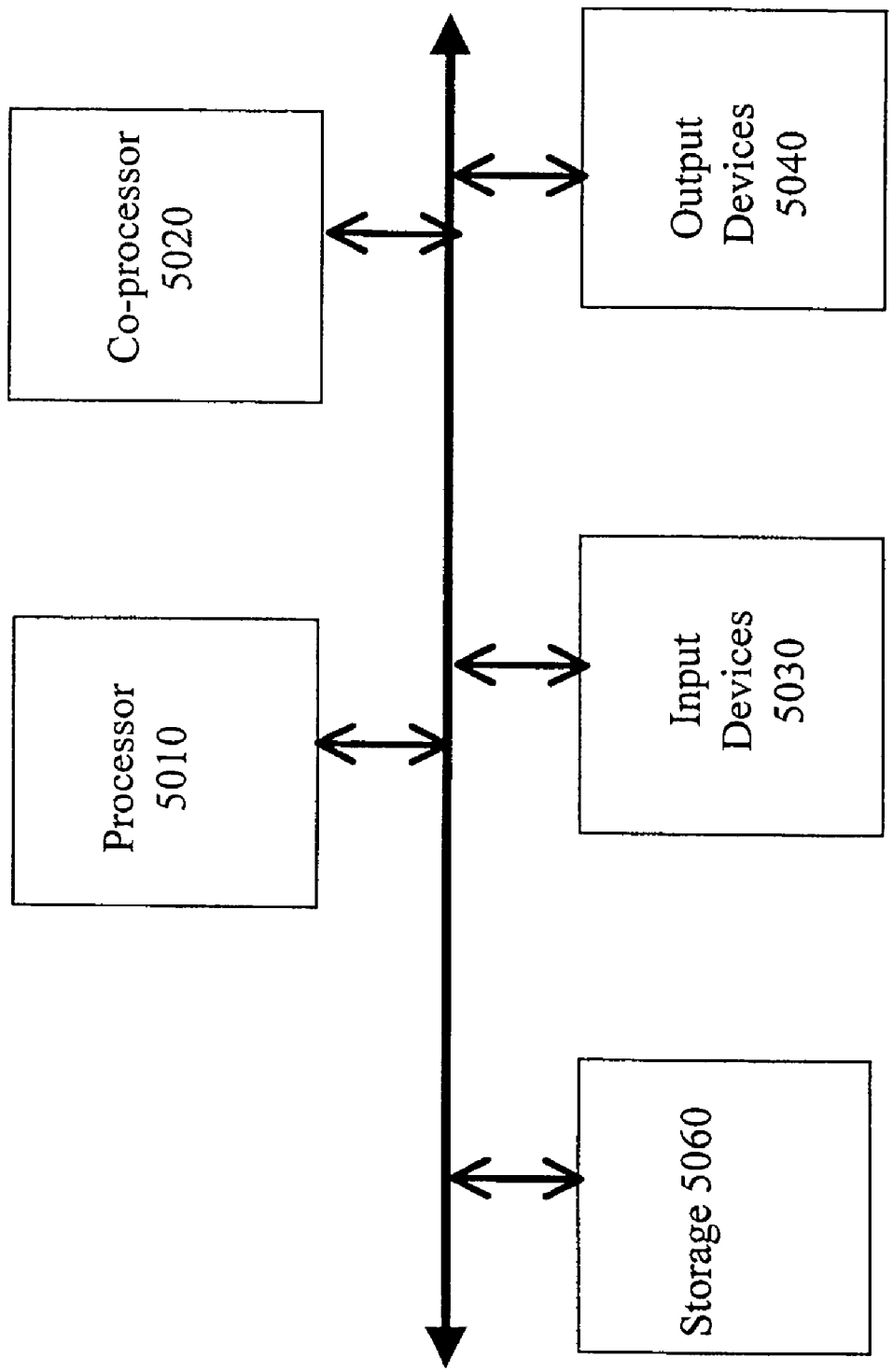
FIG. 5 is a block diagram describing an exemplary computer system configured in accordance with an embodiment of the present invention.

Referring now to FIG. 5, one embodiment of the invention may comprise a machine-readable medium storing a program comprising executable instructions implementing the architecture of FIG. 2, or effectuating the flow chart in FIG. 3 or FIG. 4. Such program may be executed by a processor 5010 or controller. The program may also execute all or part of the instructions set on a coprocessor 5020. The machine-readable medium may comprise storage mechanisms as shown in 5060. Some examples of storage may include, for example, but are not limited to, RAM, ROM, DRAM, SDRAM, cache, hard drive, floppy disc, optical disc, or any combination thereof. The processor 5010, co-processor 5020, controller and/or machine-readable medium can either be connected via a printed circuit board, or be integrated as an integrated circuit or an application specific integrated circuit. Those skilled in the art will recognize that physical storage of instructions physically changes the medium upon which it is stored, electronically, magnetically, and/or chemically so that the medium carries machine-readable information.

Such program may received interactive input from one or more of the input devices as in 5030. Some of the well known examples of input devices include keyboard, mouse and others. The program may produce output that is consumable for a person, another program, or an application in a data, voice, or video format. Audio devices, video devices and other such devices may be examples of the output devices shown in 5040. The device may be connected over networks as shown in 5070 to other devices. Some examples of connectors are RJ-45, RJ11, Wireless LAN transceiver and others. The networks may include Wireless LAN, Ethernet, Cellular and other such networks.

Although the foregoing detailed description describes certain embodiments with a degree of specificity, it should be noted that the foregoing embodiments are by way of example, and are subject to modifications, substitutions, or alterations without departing from the spirit of scope of the invention. Accordingly, the invention is only limited by the following claims, and equivalents thereof.

What is claimed is:

1. An apparatus comprising:
one or more machine-readable media configured to store a program comprising a plurality of executable instructions;
a processor coupled to the machine-readable media and configured to execute the plurality of executable instructions;
the program configured to facilitate communication with a first access network and a second access network, the first access network and the second access network configured to provide access for a terminal to a backbone network, the second access network configured to operate as an alternative to the first access network, the first access network configured to operate as an alternative to the second access network;
the program comprising:
a session convergence layer comprising a first portion of the plurality of executable instructions; and
a transport convergence layer comprising a second portion of the plurality of executable instructions.

2. The apparatus of claim 1, the program configured to:
select one network of the first access network and the second access network; and
communicate information to or from the selected one network.

3. The apparatus of claim 1, the program configured to:
receive a user preference; and
select one network of the first access network and the second access network according to the user preference.

4. The apparatus of claim 1, the program configured to:
identify information to be transmitted or received; and
select one network of the first access network and the second access network according to the information.

5. The apparatus of claim 1, the first access network comprising a first selected one of the following, the second access network comprising a second selected one of the following, the first selected one different from the second selected one:
an Internet Protocol (IP) network;
a wireless access network;
a wireless local area network (LAN); and
a cellular network.

6. The apparatus of claim 1, the one or more machine-readable media and the processor embodied in a peer.

7. The apparatus of claim 1, the program configured to:
match resource availability between the first access network and the second access network.

8. The apparatus of claim 1, the program configured to:
match one or more application requirements between the first access network and the second access network.

9. The apparatus of claim 1, the program configured to:
communicate a first type of media over the first access network; and
communicate a second type of media over the second access network.

10. The apparatus of claim 1, the program configured to:
communicate voice over the first access network; and
communicate video over the second access network.

11. An apparatus comprising:
one or more machine-readable media configured to store a program comprising a plurality of executable instructions; and
a processor coupled to the machine-readable media and configured to execute the plurality of executable instructions;
the program configured to:
facilitate communication with a first access network and a second access network, the first access network and the second access network configured to provide access for a terminal to a backbone network, the second access network configured to operate as an alternative to the first access network, the first access network configured to operate as an alternative to the second access network;
determine that there is no connection meeting one or more policy criteria; and
perform an operation on one or more existing connections in response to the determination.

12. A method comprising:
executing, by a processor, a plurality of executable instructions of a program stored in one or more machine-readable media;
facilitating communication with a first access network and a second access network according to the program, the first access network and the second access network configured to provide access for a terminal to a backbone network, the second access network configured to operate as an alternative to the first access network, the first access network configured to operate as an alternative to the second access network;
selecting one network of the first access network and the second access network; and
communicating information to or from the selected one network;
the program comprising:
a session convergence layer comprising a first portion of the plurality of executable instructions; and
a transport convergence layer comprising a second portion of the plurality of executable instructions.

13. The method of claim 12, the selecting the one network further comprising:
receiving a user preference; and
selecting one network of the first access network and the second access network according to the user preference.

14. The method of claim 12, the selecting the one network further comprising:
identifying information to be transmitted or received; and
selecting one network of the first access network and the second access network according to the information.

15. The method of claim 12, the first access network comprising a first selected one of the following, the second access network comprising a second selected one of the following, the first selected one different from the second selected one:
an Internet Protocol (IP) network;
a wireless access network;
a wireless local area network (LAN); and
a cellular network.

16. The method of claim 12, the one or more machine-readable media and the processor embodied in a peer.

17. The method of claim 12, further comprising:
matching resource availability between the first access network and the second access network.

18. The method of claim 12, further comprising:
matching one or more application requirements between the first access network and the second access network.

19. The method of claim 12, further comprising:
communicating a first type of media over the first access network; and
communicating a second type of media over the second access network.

20. The method of claim 12, further comprising:
communicating voice over the first access network; and
communicating video over the second access network.

21. A method comprising:
executing, by a processor, a plurality of executable instructions of a program stored in one or more machine-readable media;
facilitating communication with a first access network and a second access network according to the program, the first access network and the second access network configured to provide access for a terminal to a backbone network, the second access network configured to operate as an alternative to the first access network, the first access network configured to operate as an alternative to the second access network;
selecting one network of the first access network and the second access network;
communicating information to or from the selected one network;
determining that there is no connection meeting one or more policy criteria; and
performing an operation on one or more existing connections in response to the determination.

22. One or more machine-readable media storing a program comprising a plurality of executable instructions, the program when executed operable to:
facilitate communication with a first access network and a second access network according to the program, the first access network and the second access network configured to provide access for a terminal to a backbone network, the second access network configured to operate as an alternative to the first access network, the first access network configured to operate as an alternative to the second access network;
select one network of the first access network and the second access network; and
communicate information to or from the selected one network;
the program comprising:
a session convergence layer comprising a first portion of the plurality of executable instructions; and
a transport convergence layer comprising a second portion of the plurality of executable instructions.

23. The machine-readable media of claim 22, the program further operable to select the one network by:
receiving a user preference; and
selecting one network of the first access network and the second access network according to the user preference.

24. The machine-readable media of claim 22, the program further operable to select the one network by:
identifying information to be transmitted or received; and
selecting one network of the first access network and the second access network according to the information.

25. The machine-readable media of claim 22, the first access network comprising a first selected one of the following, the second access network comprising a second selected one of the following, the first selected one different from the second selected one:
an Internet Protocol (IP) network;
a wireless access network;
a wireless local area network (LAN); and
a cellular network.

26. The machine-readable media of claim 22, the one or more machine-readable media and the processor embodied in a peer.

27. The machine-readable media of claim 22, the program configured to:
   match resource availability between the first access network and the second access network.

28. The machine-readable media of claim 22, the program configured to:
   match one or more application requirements between the first access network and the second access network.

29. The machine-readable media of claim 22, the program configured to:
   communicate a first type of media over the first access network; and
   communicate a second type of media over the second access network.

30. The machine-readable media of claim 22, the program configured to:
   communicate voice over the first access network; and
   communicate video over the second access network.

31. One or more machine-readable media storing a program comprising a plurality of executable instructions, the program when executed operable to:
   facilitate communication with a first access network and a second access network according to the program, the first access network and the second access network configured to provide access for a terminal to a backbone network, the second access network configured to operate as an alternative to the first access network, the first access network configured to operate as an alternative to the second access network;
   select one network of the first access network and the second access network;
   communicate information to or from the selected one network;
   determine that there is no connection meeting one or more policy criteria; and
   perform an operation on one or more existing connections in response to the determination.

* * * * *